United States Patent [19]

Porat et al.

[11] Patent Number: 4,930,365
[45] Date of Patent: Jun. 5, 1990

[54] TWO AXIS RATE GYROSCOPE

[76] Inventors: Itzhak Porat, 4, Caspary Street, Haifa 34 673; Jehuda Rosenberg, 67, Habonim Street, Kiryat Tivon 36 000; Ehud Netzer, P.O. Box 87, Timrat Migdal Haemek Post, 10505; Yishai Netzer, Yuvalim 112, Gush-Segev 20 142, all of Israel

[21] Appl. No.: 247,083

[22] Filed: Sep. 16, 1988

Related U.S. Application Data

[63] Continuation-in-part of Ser. No. 96,396, Sep. 11, 1987, abandoned.

[30] Foreign Application Priority Data

Jan. 9, 1987 [IL] Israel ............................. 81215

[51] Int. Cl.[5] ............... G01C 19/28; G01C 19/22
[52] U.S. Cl. ................... 74/5.6 A; 74/5 F; 250/231.12
[58] Field of Search ............ 74/5 F, 5.6 R, 5.6 A, 74/5.6 D; 250/231 GY

[56] References Cited

U.S. PATENT DOCUMENTS

| 2,959,060 | 11/1960 | Kunz | 74/5.6 A |
|---|---|---|---|
| 3,077,785 | 2/1963 | Stiles | 74/5 F X |
| 3,176,523 | 4/1965 | Amlie et al. | 74/5 F X |
| 3,194,079 | 7/1965 | Humphrey | 74/5.6 R |
| 3,752,998 | 8/1973 | Stripling et al. | 250/231 GY X |
| 3,886,361 | 5/1975 | Wester | 250/231 GY X |
| 4,095,477 | 6/1978 | Morris et al. | 74/5.6 D |
| 4,258,577 | 3/1981 | Fox et al. | 74/5.6 R |
| 4,339,959 | 7/1982 | Klaus et al. | 74/5.6 A |

FOREIGN PATENT DOCUMENTS 1087193 2/1955 France ............................. 74/5.6 R Primary Examiner—Rodney H. Bonck

[57] ABSTRACT

A gymballess, two axis rate gyroscope in which an inertia rotor is keyed on the electric motor shaft. The motor shaft comprises a flexible part (flexure shaft) adapted to flex upon precession of the inertia rotor in consequence of an angular velocity input around either of two axes normal to each other and both normal to the rotor spin axis, and an end portion extending beyond the inertia rotor in a direction away from the electric motor (delfector). The gyroscope further comprises a non-contacting measuring device in association with the deflector for detecting any deflection thereof.

10 Claims, 5 Drawing Sheets

TWO AXIS RATE GYROSCOPE

This application is a continuation-in-part of application Ser. No. 96,396 filed Sept. 11, 1987 and now abandoned.

FIELD OF THE INVENTION

The present invention relates to a gymballess, two axis angular velocity sensing gyroscope (also known as two axis rate gyroscope) of the low-to-medium accuracy type having a 3-4 decade measurement range. Such gyroscopes have various civil and military applications, typical civil applications being stabilization of radar antennas, stabilization of land vehicles and sea vessels, various civil aviation applications, and typical military applications being the stabilization of guns in tanks and the flight stabilization of air to air missiles.

THE PRIOR ART

Two axis rate gyroscopes are known. Thus, for example, U.S. Pat. No. 3,176,523 discloses a two axis rate gyroscope comprising an electric motor whose rotor is also the gyro inertia rotor, which rotor is enclosed in an inner cell and is rotatably mounted on a hub or hollow spin shaft thereof. The housing is in turn mounted by means of the said hub on a flexure shaft which in turn is mounted in an outer cell. The flexure shaft is coaxial with the spin axis of the rotor and any precession of the rotor resulting from an angular velocity being imparted to the rotor about either of two axes perpendicular to the spin axis acts indirectly via said hollow spin shaft on the flexure shaft causing deflection of the latter, whereby the inner cell is inclined and such inclination is sensed by a suitable pick-off. The performance of this gyroscope is unsatisfactory since it manifests on the one hand a low sensitivity to a low angular velocities while on the other hand it embodies an inherent factor of inaccuracy which is due to the fact that the double purpose electric motor/inertia rotor is very sensitive to even slight inaccuracies of dimensions and is liable to cause deflections of the flexure shaft even in the absence of an angular velocity. In such a case the motor will create a turning moment to undo such deflection, which, however, impairs the accuracy of the pickoff.

Another type of two axis rate gyroscope is disclosed in U.S. Pat. No. 4,095,477. The inertia rotor of that gyroscope is in form of a rotating disc comprising a flexible diaphragm which flexes in consequence of the precession resulting from angular velocity inputs about either of two axes normal to each other and perpendicular to the spin axis, which deflections again are sensed by suitable pick-offs. In this device the diaphragm has to combine a degree of flexibility needed to impart the required sensitivity with a capacity to sustain the relatively large mass required for a properly functioning inertia rotor and these two requirements are difficult to reconcile.

Yet another two axis rate gyroscope is described in U.S. Pat. No. 4,258,577. In this gyroscope springy, vibrating elements are supported in cantilever fashion from the rotor and extend in a generally inward direction toward the rotor axis essentially normal thereto. The centres of mass of the vibrating elements are out of alignment with the rotor axis and the elements are free to vibrate in directions essentially parallel to that axis. The output of the gyroscope is derived from detection of these vibrations and the information is received by way of variations in the rate of revolution of the rotor. The system is of relatively low sensitivity due to the fact that the background noises resulting from the rotor bearings interfere with the output. Furthermore, for proper operation the gyroscope has to be in a turned state in which the frequency of revolution is equal to the natural frequency of the vibrating element. This however is a very labile state highly sensitive to outside interference.

It is the object of the present invention to provide an improved two axis rate gyroscope which combines satisfactory sensitivity and accuracy with reliability of performance.

GENERAL DESCRIPTION OF THE INVENTION

In the following specification and claims the terms "axisymmetric" and "asymmetric" will be used in relation to the geometry of two axis rate gyroscopes according to the invention. The term "axisymmetric" is used in its conventional meaning to denote a body that is symmetric all around a central axis. The term "asymmetric" is used in respect of bodies that are not axisymmetric but which may still be symmetric with respect to one or more planes extending through the central axis.

In accordance with the present invention there is provided a two axis rate gyroscope of the kind comprising an electric motor driven inertia rotor that is distinct from the motor rotor, which inertia rotor is keyed on the electric motor shaft, characterized in that the portion of the motor shaft on which the inertia rotor is keyed comprises a flexible part (flexure shaft) adapted to flex upon precession of the inertia rotor in consequence of an angular velocity input around either of two axes normal to each other and both normal to the rotor spin axis; in that the shaft comprises an end portion extending beyond the inertia rotor in a direction away from the electric motor (deflector); and by non-contacting measuring means in association with said deflector for detecting any deflection thereof.

In the two axis gyroscope according to the invention the output is by way of deflection of the shaft end portion which deflection is sensed by said non-contacting measuring means, which ensures a high degree of reliability.

In accordance with one embodiment of the invention the inertia rotor and the flexure shaft are both axisymmetric. In this case a separate set of non-contacting measuring means is required for each axis of angular velocity input so that altogether two such sets are required.

In accordance with another embodiment of the invention the inertia rotor is asymmetric while the flexure shaft is axisymmetric. In this case the angular velocities in both axes can be determined by measuring only one single deflection of the deflector so that the only one single set of non-contacting measuring means is required.

In accordance with yet another embodiment of the invention the inertia rotor is axisymmetric while the flexure shaft is asymmetric, i.e. in the nature of a leaf spring having only one single degree of flexure freedom. Also in this case the two angular velocities can be sensed by measuring only one deflection of the deflector so that here too only one set of non-contacting measurement means is required.

DESCRIPTION OF THE DRAWINGS

For better understanding the invention will now be described with reference to the annexed drawings in which.

DESCRIPTION OF A SPECIFIC EMBODIMENT

Figure 1:
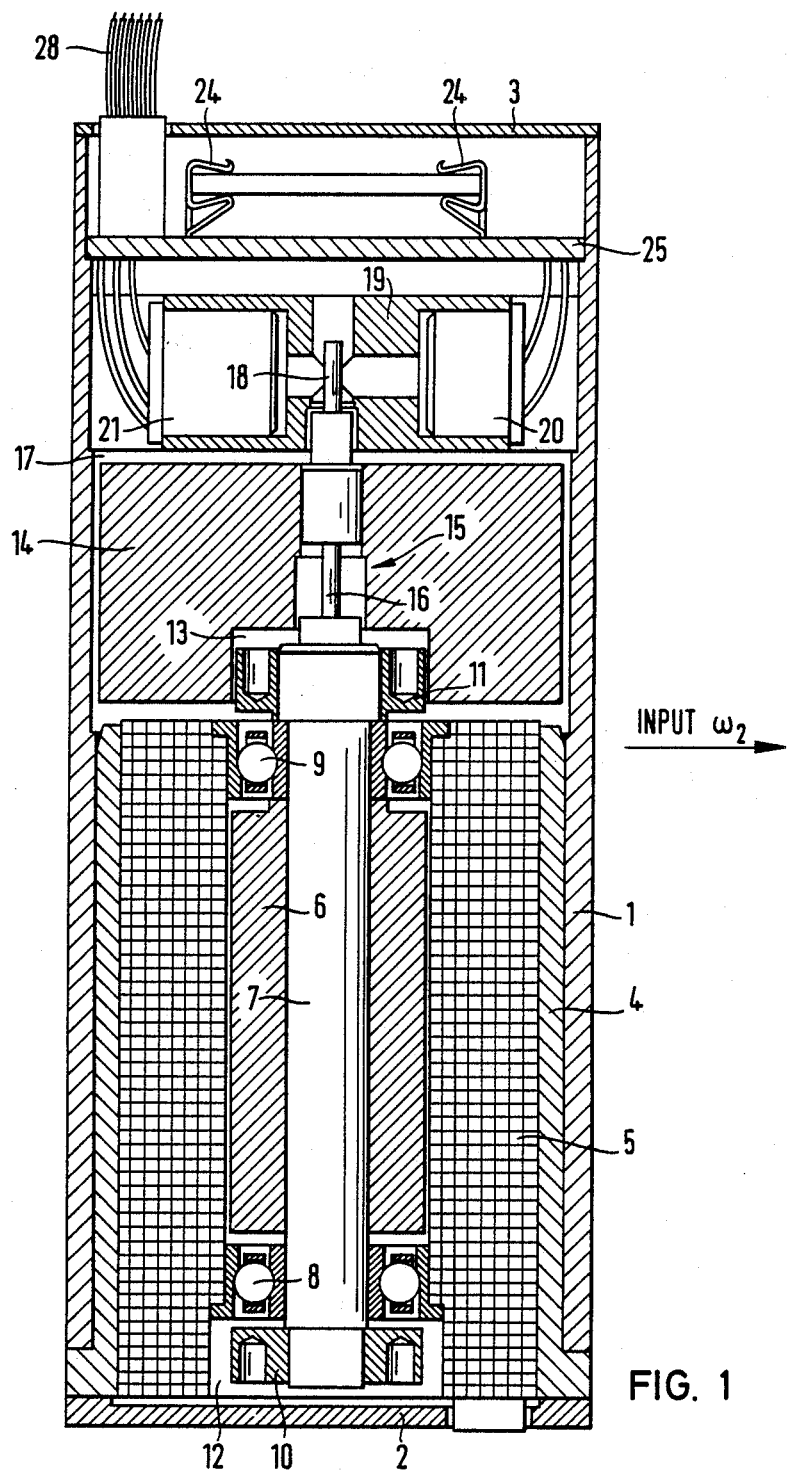
FIG. 1 is a diagrammatic axial section of a two axis rate gyroscope according to the invention.
Figure 2:
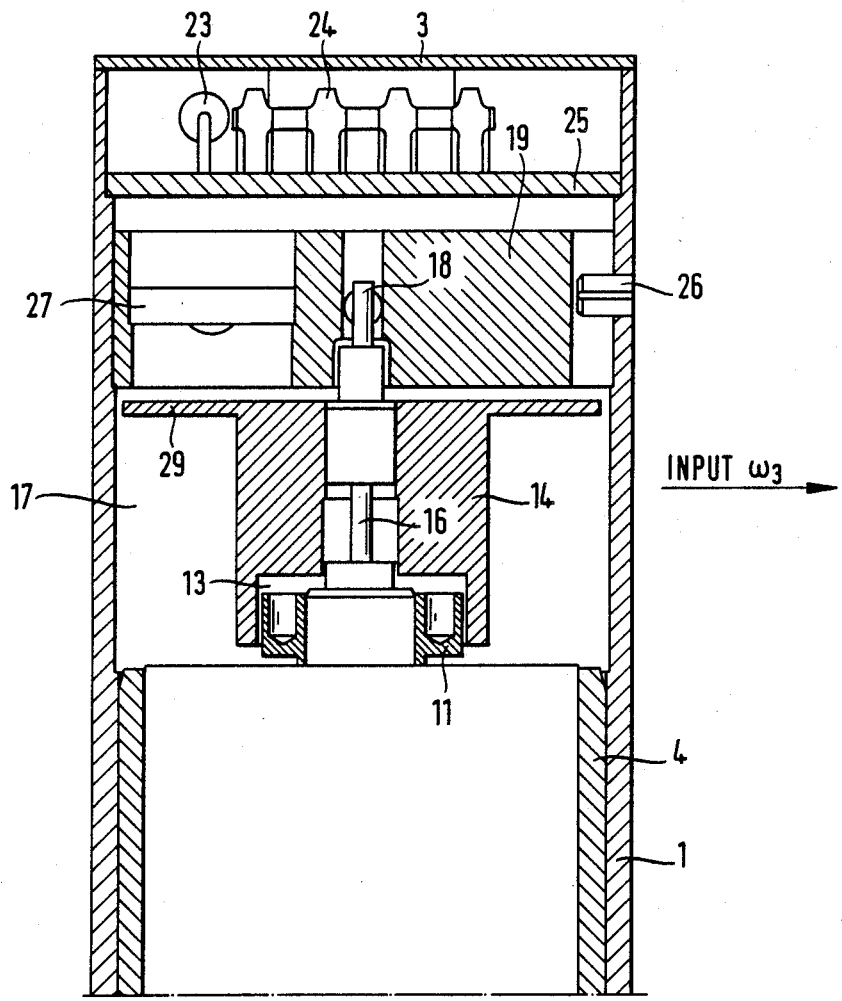
FIG. 2 is a fragmentary diagrammatic axial section of the gyroscope of FIG. 1 in a plane normal to the section plane of FIG. 1.

The two axis rate gyroscope according to the invention shown in FIGS. 1 and 2 comprises a casing 1 having end plates 2 and 3 within which there is mounted by means of an adaptor 4 an electric hysteresis motor comprising a stator 5 and a rotor (hysteresis ring) 6. The rotor 6 is keyed on a shaft 7 mounted on a pair of bearings 8 and 9. Also keyed on shaft 7 are two balancing discs 10 and 11 of which the former is freely rotatable within a cavity 12 while the latter fits in a tight fit within cavity 13 of an inertia rotor 14 having a top plate 29 with black and white fields, the distance of disc 11 from the end wall of cavity 13 being adjustable as may be required for proper functioning. A shaft portion 15 extending beyond the balancing disc 11 comprises a flexible portion 16 of reduced diameter confined between two stretches of regular diameter and functioning as flexure shaft. The inertia rotor 14 of the gyroscope of FIGS. 1 and 2 is of the asymmetric type and has the shape shown in FIG. 3. It fits freely into a rotor chamber 17 and is keyed on shaft portion 15 so as to be directly rotatable by the electric rotor 6.

Extending beyond inertia rotor 14 is a stepped shaft portion whose terminal portion 18 serves as deflector in a non-contacting measuring arrangement designed for detecting any bending of flexure shaft 16 in consequence of any precession of the inertia rotor 14 due to an angular velocity input in either of two perpendicular axes both normal to the axis of rotation of the inertia rotor 14.

Figure 4:
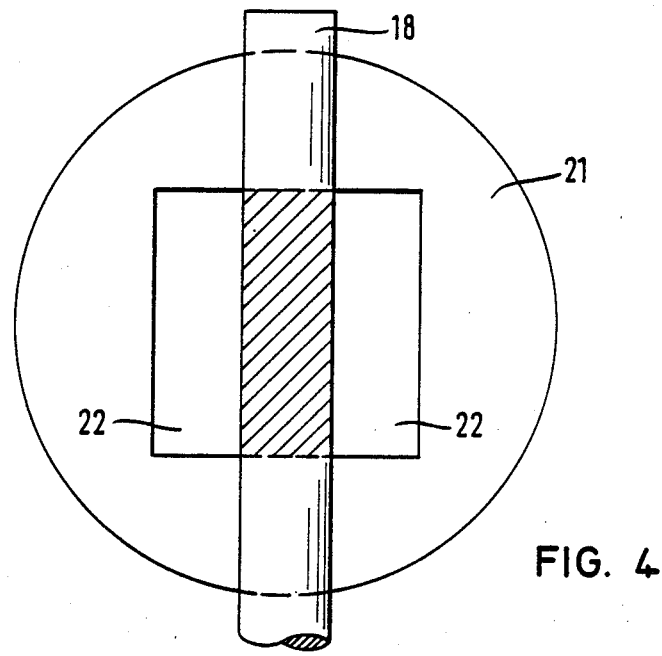
FIG. 4 is a diagrammatic illustration drawn to a larger scale of electro optical means for the detection of deflections of the deflector in a gyroscope of FIGS. 1 and 2.

The deflector 18 is located within an optical head 19 comprising a light source 20 and an electro-optic sensor 21 which may, for example, be a photodiode. As shown in FIG. 4, the electro-optic sensor comprises two juxtaposed and contiguous sensing elements 22 which are illuminated by the light source 20 but for a shade cast by deflector 18. In the absence of any angular velocity the flexure shaft 16 is undeflected and deflector 18 is in its normal, fully upright position shown in FIG. 4 in which the partition of the shaded area between sensing elements 22 is even. In case of a deflection the shaded area moves left or right whereby the illumination of the two sensing elements 22 and the partition of the shaded area between them becomes uneven. In consequence the electro-optic sensor 21 produces an output that is fed into and processed by an electronic device comprising a preamplifier 23 and a card bearing printed circuits 24 and a supporting board 25 which also carries a printed circuit for connecting the optical components.

The optic head is held in a tight fit, and, if desired, also by a suitable binder and the angular position is fixed by means of a pin 26 shown in FIG. 2. As further shown in FIG. 2 the optic head 19 comprises a reference sensor 27 with a light source and detector which in association with the top plate 29 of inertia rotor 14 produces a reference signal by which it becomes possible that angular velocity inputs about two aces can be sensed by measuring only one deflection.

The electric wires (not shown) for electric current supply to the electric motor pass through end plate 2 while the electric wires 28 for energizing the optic head 19 and the electronic circuitry thereof pass through end plate 3.

The inertia rotor 14 is located on shaft 7 in such a manner that transverse linear acceleration does not affect the light partition between the sensing elements 22. Any angular velocity input is translated by the gyroscope according to the invention into linear deflection of deflector 18 which causes a change of the light partition between the two sensing elements 22, the balancing disc 11 preventing excessive deflection.

As mentioned before, within the scope of the present invention the following three embodiments are conceivable:

(i) Axisymmetric rotor and axisymmetric flexure shaft.
In this case the output deflection angles will be in the form of:

$$\theta_2 = -\alpha_1 \cdot \omega_3$$

$$\theta_3 = \alpha_1 \cdot \omega_2$$

where $\theta_2$, $\theta_3$ are the deflection angles to be measured;

$\alpha_1$ is a constant coefficient characteristic of the system; and $\omega_2$, $\omega_3$ are the angular rates to be sensed. In this case the two angular rates are measured with two separate sets of non-contacting measuring assemblies comprising each a light source and an electro-optic sensor such as a photodiode.

(ii) Asymmetric inertia rotor and an axisymmetric flexure shaft portion. In this case the output deflection angles will be in the form of:

$$\theta_2 = -\alpha_1 \omega_3 + \alpha_2 \omega_2 \cdot \sin(2nt) - \alpha_2 \theta_3 \cdot \cos(2nt)$$

$$\theta_3 = \alpha_1 \omega_2 - \alpha_2 \omega_3 \cdot \sin(2nt) - \alpha_2 \omega_2 \cdot \cos(2nt)$$

where $\theta_2$, $\theta_3$ are the deflection angles to be measured;

$\alpha_1$, $\alpha_2$ are constant coefficients characteristic of the system;

$\omega_2$, $\omega_3$ are angular rates to be senses;

n is the spin rate of the rotor;

t is time.

In this case, by measuring only one deflection the two angular rates can be sensed. For separating the periodic part of the measured angle into the two components $\omega_2$, $\omega_3$, a reference signal is used which is produced by the reference sensor 27 having a light source and detector, in conjunction with the black and white fields on top plate 29 of asymmetric rotor 14.

(iii) Axisymmetric rotor and asymmetric flexure shaft.

In this case the output deflection angles are determined in the same way as in case (ii) above.

In both cases (ii) and (iii) above, the d.c. component of the output is not taken into consideration which reduces significantly any influence of ambient conditions, such as temperature.

Figure 5:
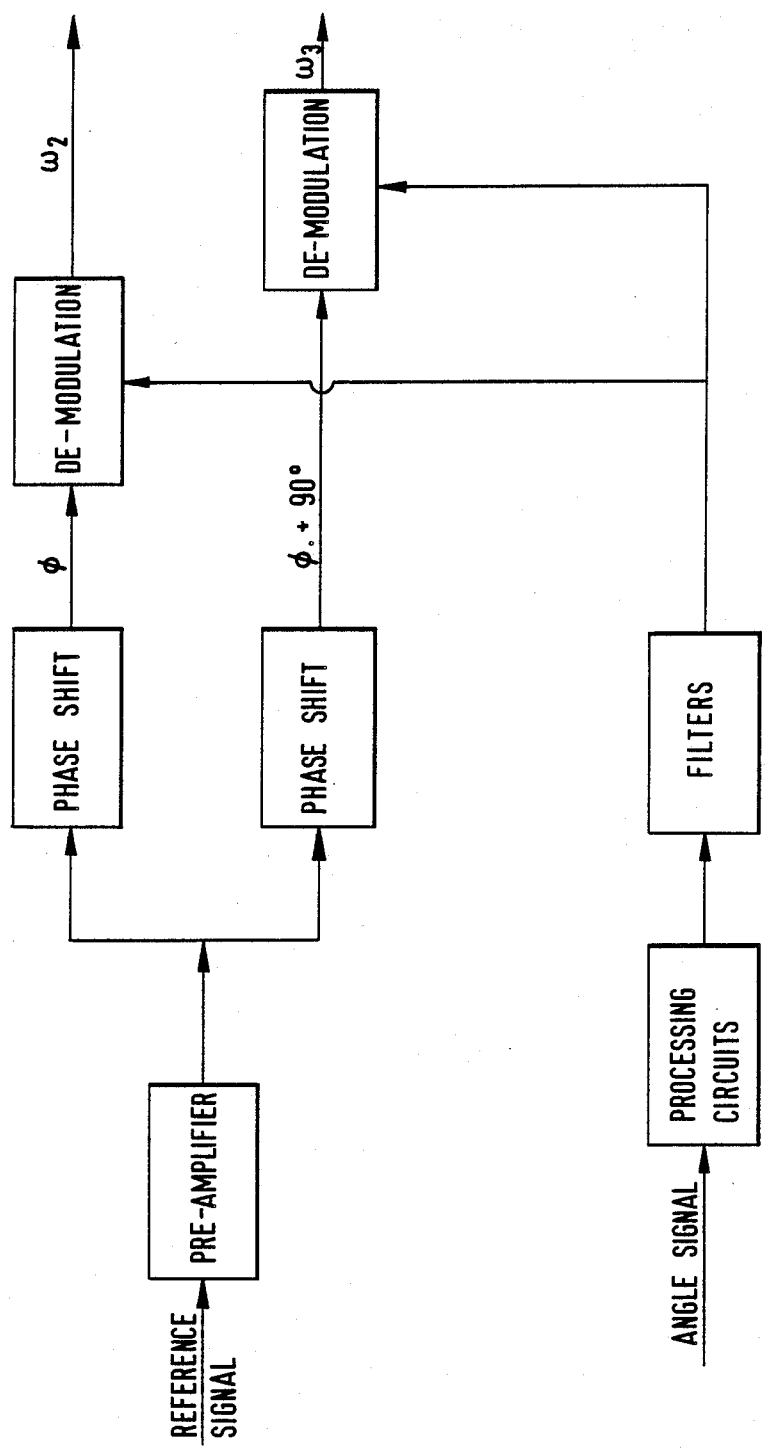
FIG. 5 is a block diagram of the electronic circuits used in processing the optical signals received in a gyroscope according to the invention with an asymmetric inertia rotor and/or an asymmetric flexure shaft.

The block diagram of FIG. 5 shows the manner in which the output signals for $\omega_2$ and $\omega_3$ are obtained in the embodiments (ii) and (iii) above. As seen there are two inputs into the circuits, one being the angle signal produced by light source 20 and photodiode 21 in consequence of the deflection of deflector 18, and the other being a reference signal produced by reference sensor 27 in conjunction with inertia rotor 14.

Figure 3:
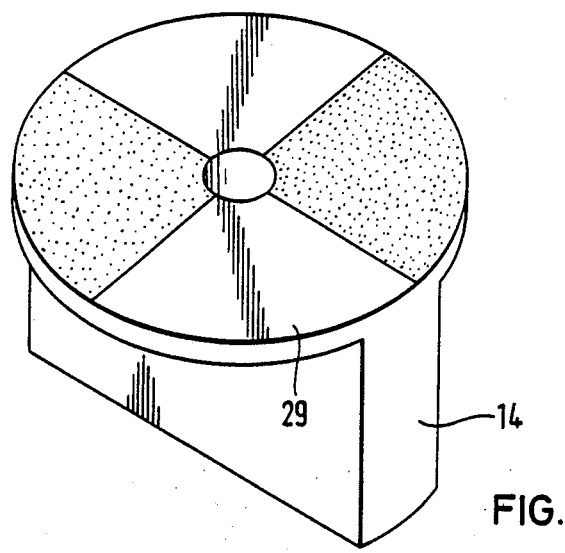
FIG. 3 is a diagrammatic perspective view of an asymmetric inertia rotor for use in the gyroscope of FIGS. 1 and 2.
Figure 6:
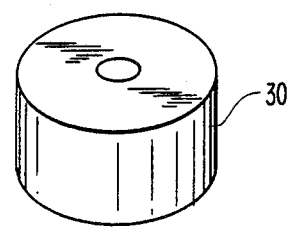
FIG. 6 is a perspective view of an axisymmetric inertia rotor for use in the gyroscope of FIGS. 1 and 2.

If desired, the asymmetric inertia rotor 14 of FIG. 3 may be replaced by an axisymmetric cylindrical inertia rotor, e.g. such as rotor 30 shown in FIG. 6.

Figure 7:
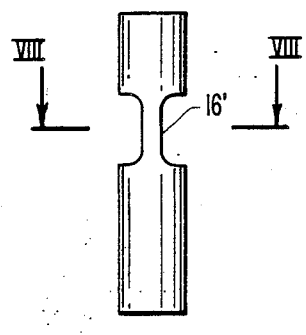
FIGS. 7 and 8 are, respectively, elevation and cross-section views of an asymmetric flexure shaft for use in the gyroscope of FIGS. 1 and 2.
Figure 9:
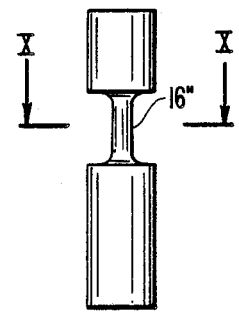
FIGS. 9 and 10 are, respectively, elevation and cross-section views of an axisymmetric flexure shaft for use in the gyroscope of FIGS. 1 and 2.
Figure 8:
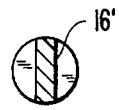
Figure 10:
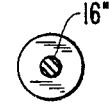

The flexure shaft 16 of the gyroscope of FIGS. 1 and 2 may be either asymmetric or axisymmetric. An asymmetric embodiment is shown in FIGS. 7 and 8, the latter being a section along line VIII—VIII of FIG. 7, in which the flexure shaft 16' is a flat bar. An axisymmetric embodiment is shown in FIGS. 9 and 10 in which the latter is a section along line X—X of the former, in which the flexure shaft 16" has the shape of a cylindrical bar.

As mentioned hereinbefore, the designer is free to choose between a combination of an axisymmetric inertia rotor with an axisymmetric flexure shaft, an asymmetric inertia rotor with an axisymmetric flexure shaft and an axisymmetric inertia rotor with an asymmetric flexure shaft. The selection of the specific combination will depend on the use requirements and it is one of the advantages of the present invention that the designer has the freedom of choice.

What is claimed is:

1. A two axis rate gyroscope of the kind comprising an electric motor driven inertia rotor that is distinct from the motor rotor, which inertia rotor is keyed on the electric motor shaft, the improvement by which the portion of the motor shaft on which the inertia rotor is keyed comprises a flexible part constituting a flexure shaft adapted to flex upon precession of the inertia rotor in consequence of an angular velocity input around either of two axes normal to each other and both normal to the rotor spin axis; the shaft comprises an end portion extending beyond the inertia rotor in a direction away from the electric motor and constituting a deflector; non-contacting measuring means being provided in association with said deflector for detecting any deflection thereof.

2. A gyroscope according to claim 1, wherein the inertia rotor and flexure shaft are both axisymmetric and comprise two sets of non-contacting measuring means, one for each angular rate input axis.

3. A gyroscope according to claim 1, wherein either of said inertia rotor and flexure shaft is asymmetric, there being provided one single set of non-contacting measuring means and means for producing a reference signal.

4. A gyroscope according to claim 3, having an asymmetric inertia rotor and an axisymmetric flexure shaft.

5. A gyroscope according to claim 3, having an axisymmetric inertia rotor and an asymmetric flexure shaft.

6. A gyroscope according claim 1, wherein the non-contacting measuring means comprise a light source and optical sensor means located on two sides of said deflector, means being provided for converting changes in the illumination of said optical sensor means into electric signals.

7. A two axis rate gyroscope of the kind comprising an electric motor driven inertia rotor that is distinct from the motor rotor, which inertia rotor is keyed on the electric motor shaft, the improvement by which the portion of the motor shaft on which the inertia rotor is keyed comprises a flexible part constituting a flexure shaft adapted to flex upon precession of the inertia rotor in consequence of an angular velocity input around either of two axes normal to each other and both normal to the rotor spin axis; either of said inertia rotor and flexure shaft is asymmetric; the shaft comprises an end portion extending beyond the inertia rotor in a direction away from the electric motor and constituting a deflector; there further being provided one single set of non-contacting measuring means and a reference sensor for producing a reference signal is associated with said inertia rotor.

8. A gyroscope according to claim 7 wherein said inertia rotor comprises a top plate with alternating differently colored fields.

9. A gyroscope according to claim 7, having an asymmetric inertia rotor and an axisymmetric flexure shaft.

10. A gyroscope according to claim 7, having an axisymmetric inertia rotor and an asymmetric flexure shaft.

* * * * *

UNITED STATES PATENT AND TRADEMARK OFFICE
CERTIFICATE OF CORRECTION

PATENT NO. : 4,930,365
DATED : June 5, 1990
INVENTOR(S) : Itzhak Porat It is certified that error appears in the above-identified patent and that said Letters Patent is hereby corrected as shown below:

On the title page item [73] Assignee: The State of Israel,
Ministry of Defence, Rafael Armament Development Authority, Israel Signed and Sealed this Second Day of July, 1991

*Attest:*

HARRY F. MANBECK, JR.

*Attesting Officer*

*Commissioner of Patents and Trademarks*